United States Patent [19]
Johnson

[11] Patent Number: 5,996,961
[45] Date of Patent: Dec. 7, 1999

[54] HEIGHT-ADJUSTABLE WORKSTAND SUPPORT

[76] Inventor: Robert E. Johnson, 622 Cumberland Hills Dr., Hendersonville, Tenn. 37075

[21] Appl. No.: 08/850,154

[22] Filed: May 2, 1997

Related U.S. Application Data

[60] Provisional application No. 60/017,020, May 3, 1996.

[51] Int. Cl.[6] ................................................. F16M 1/00
[52] U.S. Cl. ............................................. 248/669; 248/157
[58] Field of Search .................................... 248/669, 157, 248/161, 659, 661, 662, 420, 422, 425, 430, 177.1; 211/207

[56] References Cited

U.S. PATENT DOCUMENTS

| | | | |
|---|---|---|---|
| 451,006 | 4/1891 | Singer | 30/273 |
| 2,321,486 | 6/1943 | Holt | 248/669 |
| 2,348,043 | 5/1944 | Webb et al. | 248/669 |
| 2,415,820 | 2/1947 | Herring | 248/669 |
| 2,531,880 | 11/1950 | Herring | 248/669 |
| 2,624,535 | 1/1953 | Bolhoefer | 248/669 |
| 4,548,051 | 10/1985 | Moessner | 62/320 |
| 4,576,352 | 3/1986 | Ogden | 248/188.4 |
| 5,423,502 | 6/1995 | Thomason et al. | 248/125.1 |

*Primary Examiner*—Ramon O. Ramirez
*Assistant Examiner*—Tan Le
*Attorney, Agent, or Firm*—Banner & Witcoff, Ltd.

[57] ABSTRACT

A height-adjustable workstand support incorporates a pair of laterally spaced, structurally independent but synchronously driven, screw-type scissor lifts which support a top surface for machinery such as a sewing machine or the like. The support is adapted to convert a fixed-height workstand to one which is adjustable to accommodate operators of different heights, whether sitting or standing.

31 Claims, 5 Drawing Sheets

HEIGHT-ADJUSTABLE WORKSTAND SUPPORT

This application claims benefit of provisional application Ser. No. 60/017,020, filed May 3, 1996.

BACKGROUND OF THE INVENTION

This invention relates to workstand supports and, more particularly, to a workstand support which is adjustable in height to accommodate different users.

Many industrial workstands for supporting machinery, such as sewing machines, have a fixed height which is determined on the basis of comfort for operators of average height. This compromise necessarily renders such machinery less comfortable for operators who are substantially shorter or taller than the average, and will not accommodate operators who sit and stand. Long-term use of improperly positioned machinery can cause strain, premature fatigue and even cumulative trauma-type injuries.

Adjustable workstands for sewing machines and the like have been developed, but these generally are specially designed complex and costly units employing, for example, a plurality of hydraulic or pneumatic lifts which are prone to leakage and can be difficult to synchronize. Installation of such adjustable workstands also requires that the still-serviceable sturdy, fixed-height workstands be scrapped, thereby wasting the investment in that equipment.

U.S. Pat. No. 5,423,502 discloses an adjustable-height sewing machine work station, but this, too, is designed as a complete replacement for fixed-height workstands. It also makes extensive use of rack and pinion and worm gearing, or very long threaded support shafts, and special adjustments for preventing wobbling or shaking of the work station each time its height is changed. These elements tend to increase cost of the unit, and complicate its adjustment. A need therefore exists for a sturdy, low-cost, height-adjustable workstand for sewing machines and other industrial applications.

SUMMARY OF THE INVENTION

It is, therefore, an object of the present invention to provide an economical height-adjustable workstand which is easy to operate and sturdily supports a top surface in all set positions.

It is a further object of the invention to provide a height-adjustable workstand which incorporates the economical and sturdy design features of known fixed-height workstands.

It is a further object of the invention to provide a height-adjustable workstand by use of a conversion kit which can be used with an existing fixed-height workstand.

These and other objects are accomplished by providing a device for vertically positioning a workstand top surface, comprising a pair of laterally spaced scissor lifts, one scissor lift adjacent each side of the top surface. Each scissor lift comprises a base; a top member movable vertically relative to the base and adapted to support the top surface; two leg members hinged together intermediate the ends thereof, one end of each of the leg members supported on the base with at least one of the leg members adapted to move forward and aft relative to the base, and the opposite ends of the leg members supporting the top member with at least one of the opposite ends adapted to move forward and aft relative to the top member; a threaded rod journaled above and extending along the base and operatively coupled to the base-supported ends when the rod is rotated, and fixing the relative positions of the base-supported ends when the rod is stationary, thereby serving to adjust and fix the height of the top member; and means for synchronously rotating the threaded rods. The scissor lifts are structurally independent of one another and interconnected only through the intermediary of the means for synchronously rotating the threaded rods.

The invention also provides a device for vertically positioning a workstand top surface relative to a workstand having laterally spaced, elongated, generally horizontal upper side rails. The device comprises a pair of scissor lifts, one scissor lift adapted to be mounted to the workstand adjacent one side rail and the other scissor lift adapted to be mounted to the workstand adjacent the other side rail so that the scissor lifts are laterally spaced from one another. Each scissor lift comprises the structure described above.

The invention further provides a method for converting a stationary, fixed-height workstand having a top surface supported on laterally spaced, elongated, generally horizontal upper side rails, to a height-adjustable workstand using the same top surface. The method comprises the steps of removing the top surface; mounting on each side rail a screw-actuated scissor lift having a vertically movable top member, one of the scissor lifts having means for rotating the screw thereof to raise or lower the top member; operatively interconnecting the scissor lifts for synchronous rotation of the screws thereof; and mounting the top surface on the top members.

The invention can be used to convert a fixed-height workstand to a height-adjustable workstand, or as part of an original equipment height-adjustable workstand. Its range of height adjustment will accommodate seated as well as standing operators.

BRIEF DESCRIPTION OF THE DRAWINGS

The invention is described in greater detail below with reference to the accompanying drawings, in which.

DETAILED DESCRIPTION

Figure 1:
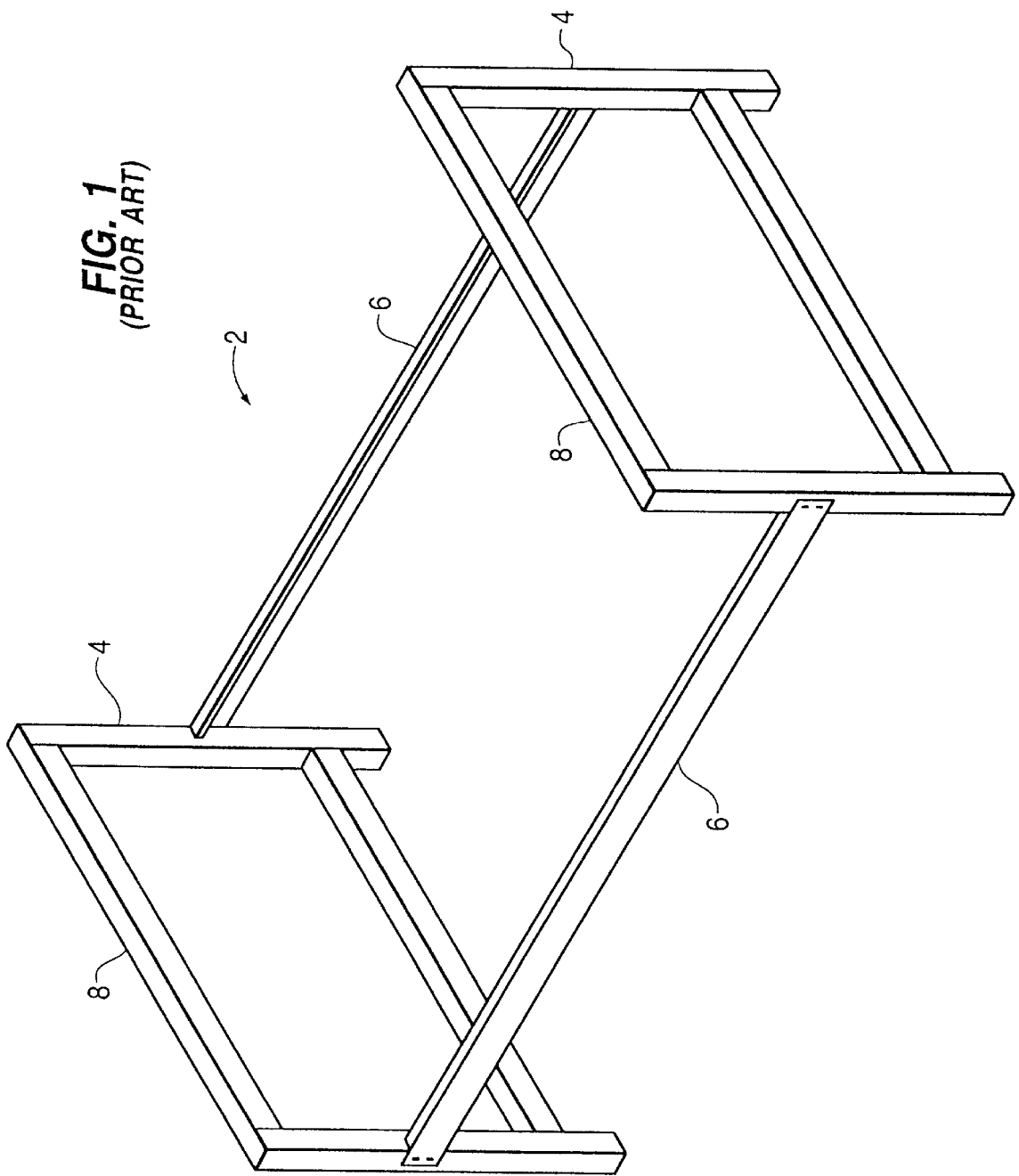
FIG. 1 is a perspective view of a typical prior art fixed-height workstand.

FIG. 1 illustrates a typical prior art fixed-height workstand 2 having side frames 4 joined together by front and rear cross-members 6. Each side frame 4 has a generally horizontal upper side rail 8 which normally supports a top surface (not shown) on which machinery, such as a sewing machine, or other equipment or items may be placed.

Figure 2:
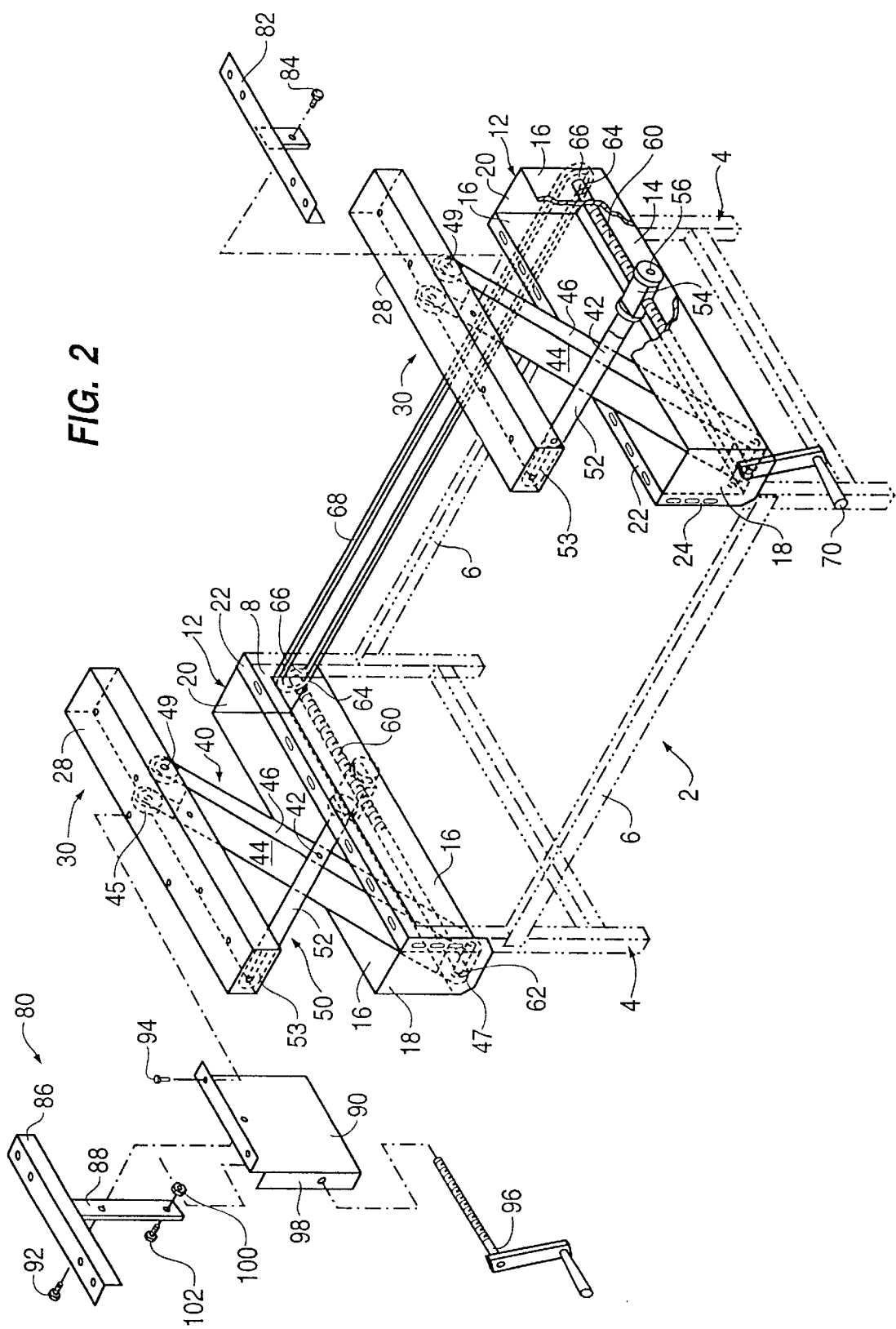
FIG. 2 is perspective and partially exploded view of a workstand according to the invention, showing the scissor lifts in elevated positions.
Figure 3:
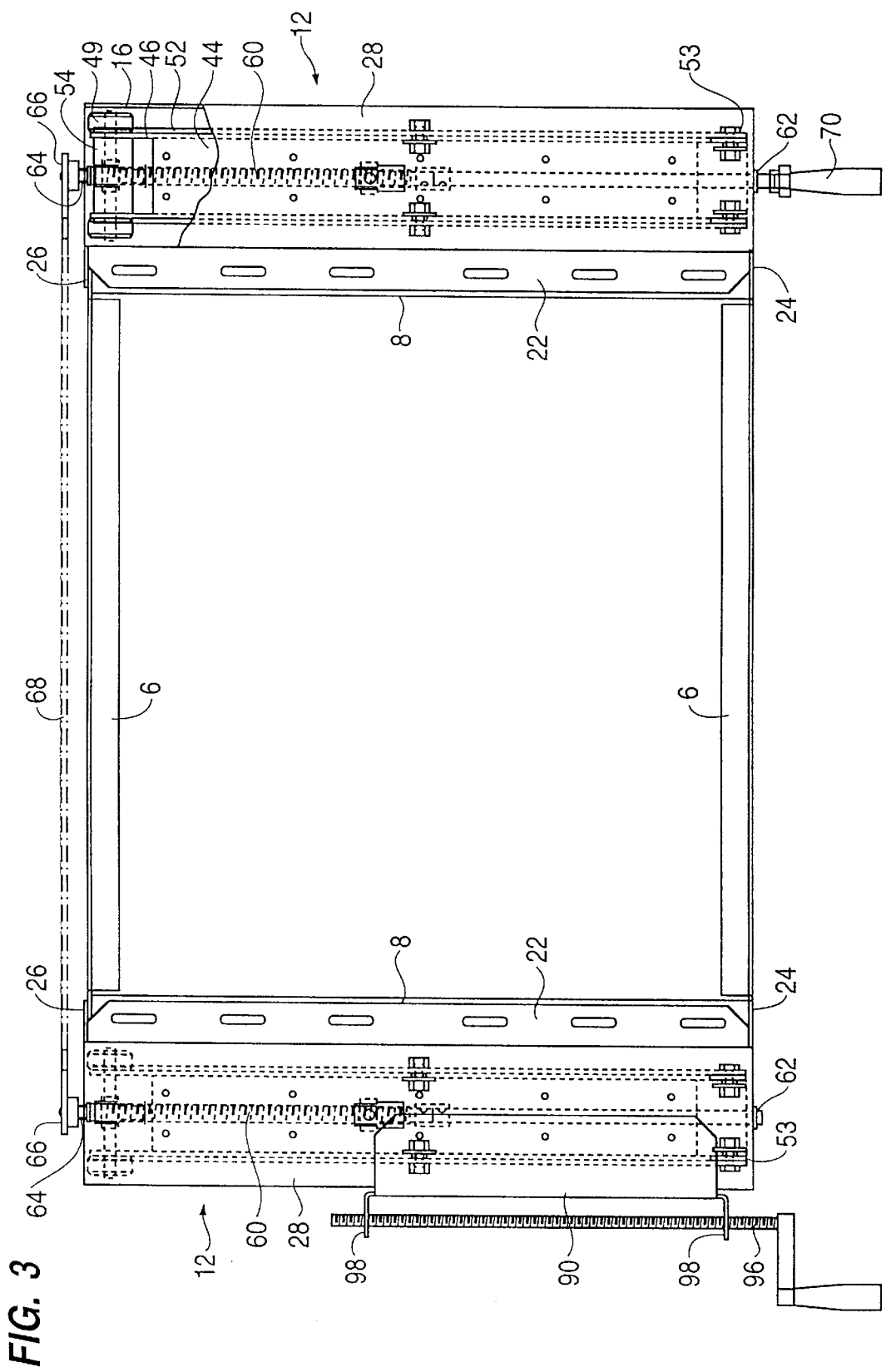
FIG. 3 is a top plan view of the workstand of the FIG. 2, showing the scissor lifts in their retracted positions.
Figure 4:
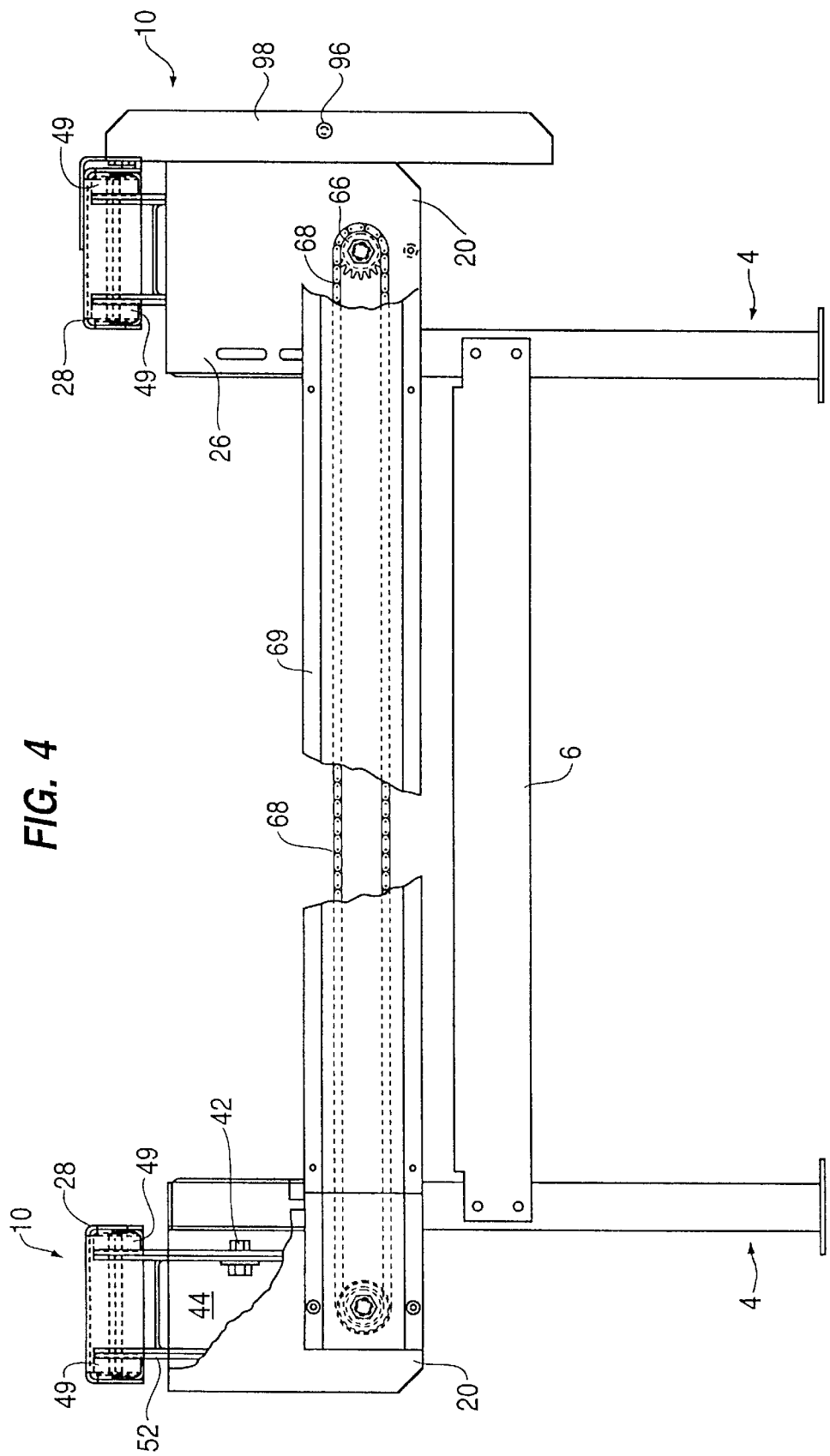
FIG. 4 is a rear elevational view of the workstand of FIG. 2, showing the scissor lifts in their retracted positions.

FIG. 2 illustrates how the height-adjustable workstand support of the invention can be mounted on a prior art fixed-height workstand 2, which is shown in phantom lines. Further details of the invention are depicted in FIGS. 3 and 4.

A lift assembly 10 is mounted to the outboard side of each side frame 4. Lift assembly 10 comprises a box channel 12 having a bottom wall 14, side walls 16, a front end wall 18, and a rear end wall 20. The inboard side wall 16 of box channel 12 is provided with a top mounting flange 22, which overlies side rail 8 of workstand 2. End walls 18, 20 also have mounting flanges 24, 26, respectively, which engage side frame 4.

Box channel 12 houses a scissor lift 30 which supports a top member 28, above which the top surface of the workstand (not shown) is mounted. Top member 28 is in the form of an inverted channel. Scissor lift 30 comprises a channel-shaped inner leg member 40, an outer leg member 50 hinged to inner leg member 40 by means of bolts 42, and a threaded rod 60 for effecting relative pivotal movement of legs 40 and 50.

Channel-shaped inner leg member 40 has a central web 44 joined to lateral flanges 46. Flanges 46 project beyond web 44 and are hinged at their proximal ends 47 to bottom wall 14 of box channel 12. The distal ends 45 of flanges 46 rotatably support rollers 49, which partially support and roll beneath top member 28.

Outer leg member 50 consists of two parallel, laterally spaced arms 52 which flank inner leg member 40 and are hinged at their proximal ends 53 to top member 28. The distal ends of arms 52 are pivotally connected to a threaded trunnion block 54 on which are rotatably mounted a pair of rollers 56, which roll along bottom wall 14.

Threaded rod 60 preferably has an acme-type screw thread and is journaled at 62 in front end wall 18, and at 64 in rear end wall 20. Trunnion block 54 is threadedly engaged with threaded rod 60 such that rotation of rod 60 causes trunnion block 54 to move along the length of box channel 12, supported on rollers 56. Threaded rod 60 projects through rear end wall 20 and has a sprocket 66 keyed or otherwise fixed thereto so as to rotate therewith. The sprockets 66 of the two lift assemblies 10 are interconnected by a chain 68, which synchronizes the rotation of the two threaded rods 60. Rotation of one threaded rod, such as by means of a crank 70, causes simultaneous rotation of the other threaded rod at the same rate so as to synchronize the vertical movement of top members 28 as scissor lifts 30 extend or retract. A chain guard 69 (FIG. 4) covers the chain and sprockets.

Means other than a crank may be employed to rotate threaded rods 60. For example, crank 70 can be replaced by an electric motor which is actuated by a conveniently placed control switch. Alternatively, crank 70 can be replaced by a simple hand wheel. Means other than sprockets 66 and chain 68 may be employed to synchronize the rotation of threaded rods 60. For example, sprockets 66 could be replaced by cogged wheels, and chain 68 replaced by a toothed timing belt. Alternative drive mechanisms and synchronizing means will be apparent to those skilled in the art.

Scissor lifts 30 provide sturdy support for the top surface and any machinery thereon by virtue of their rugged design. Specifically, the use of a channel-shaped inner leg member 40 greatly enhances the stiffness of the overall support, thereby minimizing any flex in the support structure that otherwise would be present. Additional stiffness is afforded by the box channels 12 which mount directly to the sturdily supported side rails 8 of workstand 2.

Top members 28 may directly support the top surface of the workstand but, if angular adjustment of the top surface is desired, the top surface can be mounted on a tilt mechanism 80 which allows the top surface to pivot relative to top members 28. Tilt mechanism 80 comprises a T-bracket 82 which is hinged by means of a bolt 84 to one of the top members 28. A second T-bracket 86, which has a longer stem 88, is hinged to a mounting plate 90 by means of a bolt 92. Mounting plate 90 is secured to the other top member 28 by means of screws 94. A crank-bearing threaded rod 96 is journaled in flanges 98 of mounting plate 90 and engages a nut 100 which is hinged to the lower end of stem 88 by means of a screw 102. Thus, rotation of threaded rod 96 by means of the crank will effect tilting movement of T-member 86 about bolt 92, causing the top surface to tilt as desired.

Figure 5:
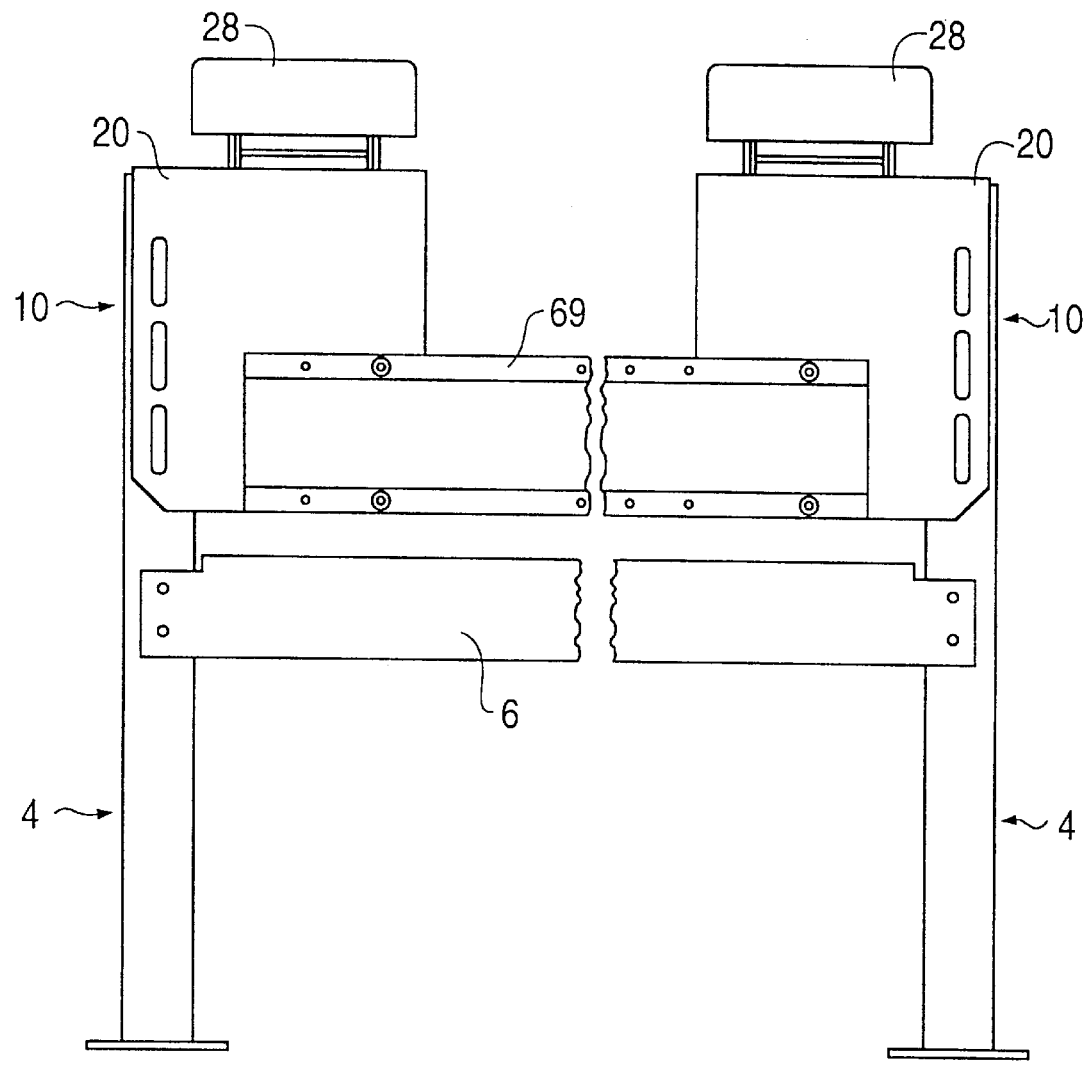
FIG. 5 is a rear elevational view of an alternate embodiment of the workstand according to the invention.

FIG. 5 illustrates an alternate mounting arrangement for lift assemblies 10. In this arrangement, the lift assemblies are mounted on the inboard faces of side frames 4 of workstand 2. This arrangement saves space by keeping the height-adjustable workstand support within the perimeter of the workstand. It also allows the use of a shorter chain and a shorter chain guard 69.

It should be noted that lift assemblies 10 are structurally independent of one another, the only connection between them being the mechanism which synchronizes the rotation of their threaded rods 60. This arrangement leaves a clear, uncluttered space beneath the top surface, and makes the height-adjustable workstand support of the invention ideally suited for retrofitting workstands of various widths. The only modification necessary is to size the chain 68 and chain guard 69 (which can be modular or have telescoping sections) to span the space between the side frames of the workstand.

For workstands of different depths, the depth of each lift assembly 10 can be sized as needed. A lift assembly 10 of given depth can even fit workstands within a range of depths. Thus, referring to FIGS. 2 and 3, a workstand that is shallower than the one illustrated will fit between front and rear mounting flanges 24, 26. For a deeper workstand, the rear wall 20 of box channel 12 can be formed without rear mounting flange 26 so that the rear of the workstand will project beyond rear wall 20.

The preferred embodiments of the invention described in the specification above and shown in the drawings are illustrative only. It is contemplated that other forms of the invention will be apparent to those skilled in the art without departing from the spirit and scope of the invention, which is limited only by the appended claims.

I claim:

1. A device for vertically positioning a workstand top surface, comprising:

a pair of laterally spaced scissor lifts, one scissor lift adjacent each side of the top surface, each scissor lift comprising:

a base;

a top member movable vertically relative to said base and adapted to support the top surface;

two leg members hinged together intermediate the ends thereof, one end of each of said leg members supported on said base with at least one end of one of said leg members adapted to move forward and aft relative to said base, and the opposite ends of said leg members supporting said top member with at least one of said opposite ends adapted to move forward and aft relative to said top member; and a threaded rod journaled above and extending along said base and operatively coupled to the base-supported end of at least one of said leg members for effecting relative fore-and-aft movement of said base-supported ends when said rod is rotated, and fling the relative positions of said base-supported ends when said rod is stationary, thereby serving to adjust and fix the height of said top member; wherein said threaded rods are distinct members separated from each other; and means for synchronously rotating said separated and distinct threaded rods, said scissor lifts being structurally independent of one another and interconnected only through the intermediary of said means for synchronously rotating said threaded rods.

2. A device according to claim 1, wherein there is a substantially clear space between said scissor lifts and below the top surface.

3. A device according to claim 1, further comprising a tilting mechanism for adjustably tilting the top surface relative to said top members.

4. A device according to claim 3, wherein said tilting mechanism comprises a tilting member pivotally attached to each of said top members and together supporting the top surface for pivoting movement about a common transverse axis, and means for locking the top surface in a fixed position.

5. A device according to claim 1, wherein one of said leg members has a proximal end hinged to said base and a distal end adapted to travel along said top member, and the other of said leg members has a proximal end hinged to said top member and a distal end adapted to travel along said base.

6. A device according to claim 5, wherein at least one roller is journaled to the distal end of each of said leg members, said rollers respectively rolling along said base and said top member.

7. A device according to claim 6, wherein the distal end of said leg member which is adapted to travel along said base carries a threaded trunnion block which is threadedly engaged with said threaded rod.

8. A device according to claim 7, wherein one of said leg members comprises two parallel, laterally spaced arms, and the other of said leg members is positioned between and hinged to said arms.

9. A device according to claim 8, wherein said other leg member has a channel-shaped cross-section along most of its length intermediate the ends thereof, the sides of the channel being hinged to said arms.

10. A device according to claim 9, wherein the distal end of said leg member which is adapted to travel along said base carries two spaced rollers on opposite sides of said threaded trunnion block.

11. A device according to claim 1, wherein said means for synchronously rotating said threaded rods comprises means for rotatably interconnecting said threaded rods, and means for rotating one of said threaded rods.

12. A device according to claim 11 wherein said means for rotatably interconnecting said threaded rods comprises a sprocket at one end of each of said threaded rods, and a chain interconnecting said sprockets.

13. A device for vertically positioning a workstand top surface relative to a workstand having laterally spaced, elongated, generally horizontal upper side rails, the device comprising:

a pair of scissor lifts, one scissor lift of said pair adapted to be mounted to the workstand adjacent one side rail and the other scissor lift of said pair adapted to be mounted to the workstand adjacent the other side rail so that said scissor lifts are laterally spaced from one another, each scissor lift comprising:

a base;

a top member movable vertically relative to said base and adapted to support the top surface;

two leg members hinged together intermediate the ends thereof, one end of each of said leg members supported on said base with at least one end of one of said leg members adapted to move forward and aft relative to said base, and the opposite ends of said leg members supporting said top member with at least one of said opposite ends adapted to move forward and aft relative to said top member; and a threaded rod journaled above and extending along said base and operatively coupled to the base-supported end of at least one of said leg members for effecting relative fore-and-aft movement of said base-supported ends when said rod is rotated, and fixing the relative positions of said base-supported ends when said rod is stationary, thereby serving to adjust and fix the height of said top member; wherein said threaded rods are distinct members separated from each other; and means for synchronously rotating said separated and distinct threaded rods, said scissor lifts being structurally independent of one another and interconnected only through the intermediary of said means for synchronously rotating said threaded rods.

14. A device according to claim 13, wherein there is a substantially clear space between said scissor lifts and below the top surface.

15. A device according to claim 13, further comprising a tilting mechanism for adjustably tilting the top surface relative to said top members.

16. A device according to claim 15, wherein said tilting mechanism comprises a tilting member pivotally attached to each of said top members and together supporting the top surface for pivoting movement about a common transverse axis, and means for locking the top surface in a fixed position.

17. A device according to claim 13, wherein said scissor lifts are adapted to be mounted to the workstand with their bases below the upper surfaces of the side rails.

18. A device according to claim 17, wherein said scissor lifts are adapted to be mounted outboard of the side rails.

19. A device according to claim 18, wherein said scissor lifts are suspended from said side rails.

20. A device according to claim 17, wherein said scissor lifts are adapted to be mounted inboard of the side rails.

21. A device according to claim 20, wherein said scissor lifts are suspended from said side rails.

22. A device according to claim 17, wherein said base is the bottom of an elongated, open-top box channel, said box channel is adapted to be mounted to the workstand, and said leg members are substantially fully retracted within said box channel when the top surface is in its lowest position.

23. A device according to claim 22, wherein said box channel has an elongated, laterally protruding, horizontal flange extending along the top of one side thereof, said flange being adapted to overlie and rest on the side rail adjacent which said box channel is to be mounted.

24. A device according to claim 23, wherein:

one of said leg members has a proximal end hinged to the side walls of said box channel adjacent one end thereof, and a roller journaled at the distal end thereof which travels along the underside of said top member;

the other of said leg members has a proximal end hinged to said top member adjacent one end thereof, a threaded trunnion block pivotally attached to the distal end thereof, and at least one roller journaled to said trunnion block which travels along said base, said trunnion block being threadedly engaged with said threaded rod;

said threaded rod is journaled in the end walls of said box channel and protrudes through at least one of said end walls; and said means for synchronously rotating said threaded rods comprises means for rotatably interconnecting the protruding ends of said threaded rods, and means for rotating one of said threaded rods.

25. A device according to claim 23, wherein one of said leg members comprises two parallel, laterally spaced arms, and the other of said leg members is positioned between said arms and has a channel-shaped cross-section along most of its length intermediate the ends thereof, the sides of the channel being hinged to said arms.

26. A device according to claim 25, wherein said threaded trunnion block is pivotally mounted between said arms, and two rollers are journaled to said trunnion block on opposite sides thereof.

27. A device according to claim 24 wherein said means for rotatably interconnecting said threaded rods comprises a sprocket at one end of each of said threaded rods, and a chain interconnecting said sprockets.

28. A method for converting a stationary, fixed-height workstand having a top surface supported on laterally spaced, elongated, generally horizontal upper side rails, to a height-adjustable workstand using the same top surface, comprising the steps of:

removing the top surface;

mounting on each side rail a screw-actuated scissor lift having a vertically movable top member, one of said scissor lifts having means for rotating the screw thereof to raise or lower said top member;

operatively interconnecting said scissor lifts for synchronous rotation of the screws thereof; and mounting said top surface on said top members.

29. A method according to claim 28, wherein said scissor lifts are mounted said side rails below the upper surfaces thereof so that said top members do not protrude above said side rails when said scissor lifts are fully retracted.

30. A method according to claim 29, wherein said scissor lifts are adapted to be mounted outboard of said side rails.

31. A device according to claim 29, wherein said scissor lifts are adapted to be mounted inboard of said side rails.

* * * * *